US012677798B1

(12) United States Patent
Otto

(10) Patent No.: US 12,677,798 B1
(45) Date of Patent: Jul. 14, 2026

(54) LIVESTOCK FEEDER

(71) Applicant: Mark Otto, Middlebury, IN (US)

(72) Inventor: Mark Otto, Middlebury, IN (US)

( * ) Notice: Subject to any disclaimer, the term of this patent is extended or adjusted under 35 U.S.C. 154(b) by 0 days.

(21) Appl. No.: 18/930,326

(22) Filed: Oct. 29, 2024

Related U.S. Application Data

(60) Provisional application No. 63/624,336, filed on Jan. 24, 2024, provisional application No. 63/595,200, filed on Nov. 1, 2023.

(51) Int. Cl.
   *A01K 5/02* (2006.01)
(52) U.S. Cl.
   CPC ................................. *A01K 5/0225* (2013.01)
(58) Field of Classification Search
   CPC ............................ A01K 5/0225; A01K 5/0218
   See application file for complete search history.

(56) References Cited

U.S. PATENT DOCUMENTS

| | | |
|---|---|---|
| 361,621 A | 4/1887 | Ferguson |
| 716,743 A | 12/1902 | McHenry et al. |
| 1,344,789 A | 6/1920 | Burnett |
| 1,383,655 A | 7/1921 | Morrison |
| 1,482,691 A | 2/1924 | Lieffring |
| 1,509,433 A | 9/1924 | Knilans |
| 1,788,092 A | 1/1931 | Fink |
| 2,171,998 A | * 9/1939 | Trapani ................ A01K 39/012 |
| | | 119/53 |
| 2,290,042 A | * 7/1942 | Granville ............. A01K 5/0107 |
| | | 222/503 |
| 2,642,838 A | 6/1953 | Fields |
| 5,209,183 A | * 5/1993 | Sampson ............. A01K 5/0107 |
| | | 119/53 |
| 9,743,640 B1 | * 8/2017 | Erskine ............... A01M 31/008 |

FOREIGN PATENT DOCUMENTS

| | | | |
|---|---|---|---|
| EP | 1161861 A2 | * 12/2001 | ........... A01K 5/0218 |
| ES | 235281 U | * 6/1978 | |

* cited by examiner

*Primary Examiner* — Ebony E Evans
(74) *Attorney, Agent, or Firm* — Larry E. Henneman, Jr.; Henneman & Associates, PLC

(57) ABSTRACT

A livestock feeder includes a hopper, a feed pan, and a door. The hopper includes an inlet and an outlet. The feed pan is coupled to the hopper and includes a first edge and an opposite second edge. The first edge is disposed to receive feed dispensed from the outlet. The door is suspended over the feed pan. The door has a proximal portion and a distal portion. The proximal portion is pivotably coupled to the hopper to facilitate the rotation of the door about an axis disposed over the feed pan, to facilitate the transition of the door between an open position and a closed position. In the closed position the distal end of the first door extends over the second edge of the feed pan. The axis is parallel to and spaced apart from a vertical plane passing through the second edge of the feed pan.

17 Claims, 10 Drawing Sheets

100

LIVESTOCK FEEDER

RELATED APPLICATIONS

This application claims the benefit of priority to U.S. Provisional Patent Application Ser. No. 63/595,200, filed Nov. 1, 2023 by the same inventor and entitled "Livestock Feeder," which is incorporated by reference herein in its entirety. This application also claims the benefit of priority to U.S. Provisional Patent Application Ser. No. 63/624,336, filed Jan. 24, 2024 by the same inventor and entitled "Livestock Feeder," which is incorporated by reference herein in its entirety.

BACKGROUND OF THE INVENTION

Field of the Invention

This invention relates generally to livestock feeders, and more particularly to livestock feeders for antlered animals. Even more particularly, this invention relates to pest-proof livestock feeders for horned and antlered animals.

Description of the Background Art

Feeders are often used to feed livestock. Livestock feeders typically include some sort of large reservoir that can be loaded with enough feed to last some extended period of time until it can be refilled again. One challenge with livestock feeders is that the feed stored therein is susceptible to pests (e.g., birds, mice, etc.), the diseases pests spread, and weather elements. Another challenge with livestock feeders is that antlered and/or horned livestock can have a hard time accessing the feed inside, because their antlers/ horns can interfere with the structure of the feeder when the animal tries to insert their head into the feeder to feed.

SUMMARY

The present invention overcomes the problems associated with the prior art by providing a livestock/wildlife feeder that is accessible to horned/antlered animals and prevents entry of rain and pests into the feed.

An example livestock feeder includes a hopper, and first feed pan, and a first door. The hopper has a first inlet configured to receive feed and a first outlet configured to dispense the feed. The first feed pan can be coupled to the hopper and can have a first edge and a second edge. The first edge can be disposed to receive the feed dispensed from the first outlet, and the second edge is opposite the first edge. The first door is suspended over the first feed pan. The first door has a proximal portion and an opposite distal portion. The proximal portion of the first door can be pivotably coupled to the hopper to facilitate the rotation of the first door about a first axis disposed over the first feed pan to facilitate the transition of the first door between an open position and a closed position. In the open position, the first feed pan is accessible to livestock. In the closed position, the distal end of the first door extends over the second edge of the first feed pan. The first axis can be parallel to and spaced apart from a first vertical plane passing through the second edge of the first feed pan. A biasing member can engage the first door to urge the first door from the open position to the closed position. Optionally, example livestock feeders can additionally include a stopper disposed to engage an exterior surface of the first door when the first door is in the closed position to prevent further rotation of the first door about the first axis.

Example livestock feeders can include a first sheet of material, a second sheet of material, a third sheet of material, a fourth sheet of material, a fifth sheet of material, and a sixth sheet of material. The first sheet of material can define a first sidewall of the hopper. The second sheet of material can define a second sidewall of the hopper opposite the first sidewall of the hopper and can be disposed parallel to the first sheet of material. The third sheet of material can define a third sidewall of the hopper and can extend perpendicular to the first sheet of material and the second sheet of material. The fourth sheet of material can define a fourth sidewall of the hopper and can extend perpendicular to the first sheet of material and the second sheet of material. The fifth sheet of material can define the first feed pan and can extend perpendicular to the first sheet of material and the second sheet of material. The sixth sheet of material can define the first door and can extend perpendicular to the first sheet of material and the second sheet of material. Optionally, each of the first sheet of material, the second sheet of material, the third sheet of material, the fourth sheet of material, the fifth sheet of material, and the sixth sheet of material can be a respective discrete section of sheet metal.

In example livestock feeders, an uppermost portion of the first outlet of the hopper can be disposed at a vertical height sufficient to allow the feed dispensed from the first outlet to move outward a horizontal distance away from the first outlet. The horizontal distance can be greater than the horizontal distance between the first axis and the uppermost portion of the first outlet.

In example livestock feeders, the distal portion of the first door can include a bend and a terminal edge. The bend is directed toward the first outlet. The terminal edge can be disposed on an opposite side of the first vertical plane relative to the first axis, when the first door is in the closed position.

Example livestock feeders can additionally include a sloped surface extending from the second edge of the first feed pan in a direction away from the first outlet. The sloped surface can direct precipitation away from the feed disposed in the first feed pan. The first vertical plane can be disposed between the sloped surface and the first outlet of the hopper.

Example livestock feeders can additionally include a pedestal. The pedestal can include a base and a column. The base is disposed below the first feed pan, and the column extends upward from the base. The column can be coupled to support the hopper, the first feed pan, the first door, and any other components of the livestock feeder.

In example livestock feeders, the first door can include a top section and a bottom section. The top section can extend at least partially downward from the proximal portion of the first door. The bottom section is disposed between the top section and the distal portion of the first door. The bottom section can extend from the top section at a downward angle toward the second edge of the first feed pan when the first door is in the closed position.

Example livestock feeders can additionally include a second feed pan and a second door. The second feed pan is coupled to the hopper. The second feed pan has a first edge and a second edge. The first edge of the second feed pan is disposed to receive the feed dispensed from a second outlet of the hopper. The second edge of the second feed pan is opposite the first edge of the second feed pan. The second door is suspended over the second feed pan. The second door has a proximal portion and an opposite distal portion. The proximal portion of the second door is pivotally coupled to the hopper to facilitate the rotation of the second door about a second axis disposed over the second feed pan to facilitate the transition of the second door between an open position and a closed position. In the open position, the second feed pan is accessible to livestock. In the closed position the distal end of the second door extends over the second edge of the second feed pan. The second axis can be parallel to and spaced apart from a second vertical plane passing through the second edge of the second feed pan.

In example livestock feeders, the second vertical plane can be parallel to the first vertical plane. The distal portion of the second door can move toward the first vertical plane as the second door transitions to the open position. The distal portion of the first door can move toward the second vertical plane as the first door transitions to the open position.

Example livestock feeders can additionally include a first biasing member and a second biasing member. The first biasing member can engage the first door and urge the first door toward the first vertical plane. The second biasing member can engage the second door and urge the second door toward the second vertical plane. An optional first stopper can be disposed to abut an exterior surface of the first door when the first door is in the closed position to prevent further rotation of the first door about the first axis. An optional second stopper can be disposed to abut an exterior surface of the second door when the second door is in the closed position to prevent further rotation of the second door about the second axis.

Example livestock feeders can be constructed of sheet material. Example feeders can include a first sheet of material, a second sheet of material, a third sheet of material, a fourth sheet of material, a fifth sheet of material, a sixth sheet of material, and a seventh sheet of material. The first sheet of material can define a first sidewall of the hopper. The second sheet of material can define a second sidewall of the hopper opposite the first sidewall of the hopper. The second sheet of material can be disposed parallel to the first sheet of material. The third sheet of material can define a third sidewall of the hopper and can extend perpendicular to the first sheet of material and the second sheet of material. The fourth sheet of material can define a fourth sidewall of the hopper and can extend perpendicular to the first sheet of material and the second sheet of material. The fifth sheet of material can define the first feed pan and the second feed pan, and can extend perpendicular to the first sheet of material and the second sheet of material. The sixth sheet of material can define the first door and can extend perpendicular to the first sheet of material and the second sheet of material. The seventh sheet of material can define the second door and can extend perpendicular to the first sheet of material and the second sheet of material. Each of the first sheet of material, the second sheet of material, the third sheet of material, the fourth sheet of material, the fifth sheet of material, the sixth sheet of material, and the seventh sheet of material can be a respective discrete section of sheet material.

In an example livestock feeder, the first door can include a top section extending at least partially downward from the proximal portion of the first door. The first door can also include a bottom section disposed between the top section of the first door and the distal portion of the first door. The bottom section of the first door can extend from the top section of the first door at a downward angle toward the second edge of the first feed pan when the first door is in the closed position. The second door can also include a top section extending at least partially downward from the proximal portion of the second door. The second door can also include a bottom section disposed between the top section of the second door and the distal portion of the second door. The bottom section of the second door can extend from the top section of the second door at a downward angle toward the second edge of the second feed pan when the second door is in the closed position.

In example livestock feeders, the first feed pan and the second feed pan can be integral parts of a single sheet of material. The single sheet of material can define a bottom wall of the hopper. The single sheet of material can include an intermediate portion disposed between the first feed pan and the second feed pan. The intermediate portion can define a first sloped surface and a second sloped surface. The first sloped surface can route the feed from the hopper to the first outlet of the hopper, and a second sloped surface can route the feed from the hopper to the second outlet of the hopper.

Example livestock feeders include a lid to cover the hopper. The lid is disposed over the inlet of the hopper. The lid can also extend out over the first and/or second axes.

An example livestock feeder includes a hopper, a door, a hinge assembly, and a feed pan. The hopper can have an inlet configured to receive feed and an outlet configured to dispense the feed. The door can have a proximal portion and an opposite distal portion. The hinge assembly can be coupled to the proximal portion of the door. The hinge assembly facilitates the rotation of the door about an axis passing through the hinge assembly, so the door can be transitioned from a closed position to an open position. The feed pan is coupled to receive feed dispensed from the outlet and is disposed below the distal portion of the door. A horizontal distance between an outer edge of the feed pan and a vertical plane passing through the hopper is greater than a horizontal distance between the axis and the vertical plane. The distal portion of the door extends over the outer edge of the feed pan when the door is in a closed position.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a livestock feeder configured to permit antlered and/or horned animals access to the feed inside. In the following description, numerous specific details are set forth (e.g., materials, fastening means, construction materials, etc.) in order to provide a thorough understanding of the invention. Those skilled in the art will recognize, however, that the invention may be practiced apart from these specific details. In other instances, details of well-known fabrication practices (e.g., sheet metal bending, fastening, etc.) and tooling have been omitted, so as not to unnecessarily obscure the present invention.

Figure 1:
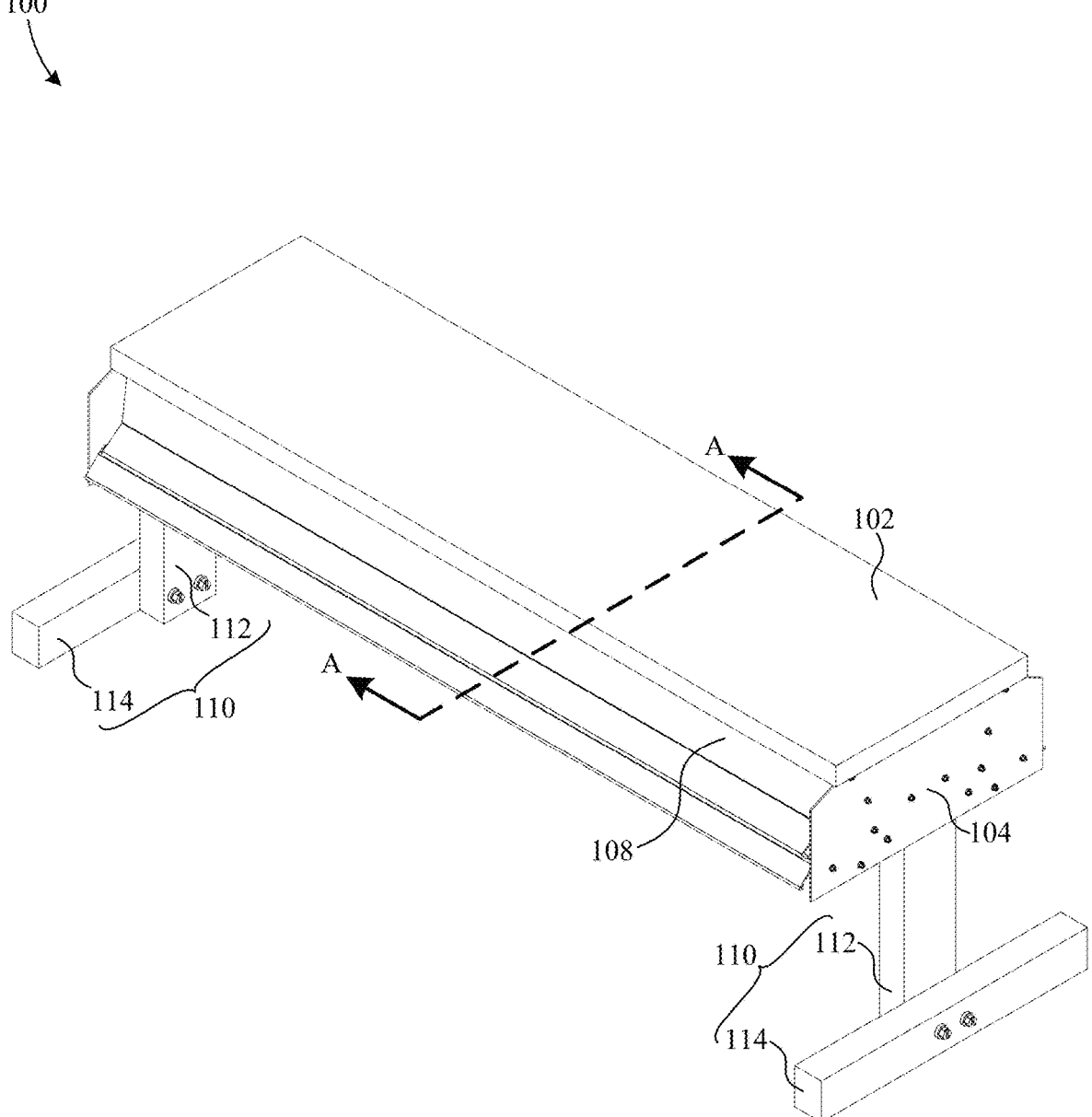
FIG. 1 is a perspective view of an example livestock feeder.

FIG. 1 shows a perspective view of a livestock feeder 100 for antlered and/or horned animals (e.g., deer, goats, etc.). Feeder 100 includes a lid 102, a hopper 104, a set of feed pans 106 (shown in FIGS. 3A and 3B), a set of doors 108, and a set of legs 110. Lid 102 rests on top of hopper 104 and is removable so hopper 104 can be refilled with feed. Lid 102 protects the feed within hopper 104 from pests and precipitation such as rain and snow. Hopper 104 is configured to store feed therein, and also to direct more feed towards doors 108 as the feed is consumed. The feed within hopper 104 automatically flows into feed pans 106 from hopper 104 via gravity. Doors 108 are coupled to hopper 104 by hinges and are configured to protect the feed from pests and weather. To access feed in feed pans 106, the animal urges door 108 inward. When the animal is done feeding and stops urging door 108 inward, door 108 automatically returns to a closed position as shown. Legs 110 are bolted to the bottom of hopper 104 in an elevated position which, in this example, is elevated to a height at which doors 108 are approximately level to a whitetail deer's chest. Each of the two legs 110 includes a column 112 extending upward from a respective base 114. Each base 114 has a length sufficient to prevent feeder 100 from being tipped over. In this example, the length of each base 114 is slightly longer than the distance between doors 108.

Figure 2:
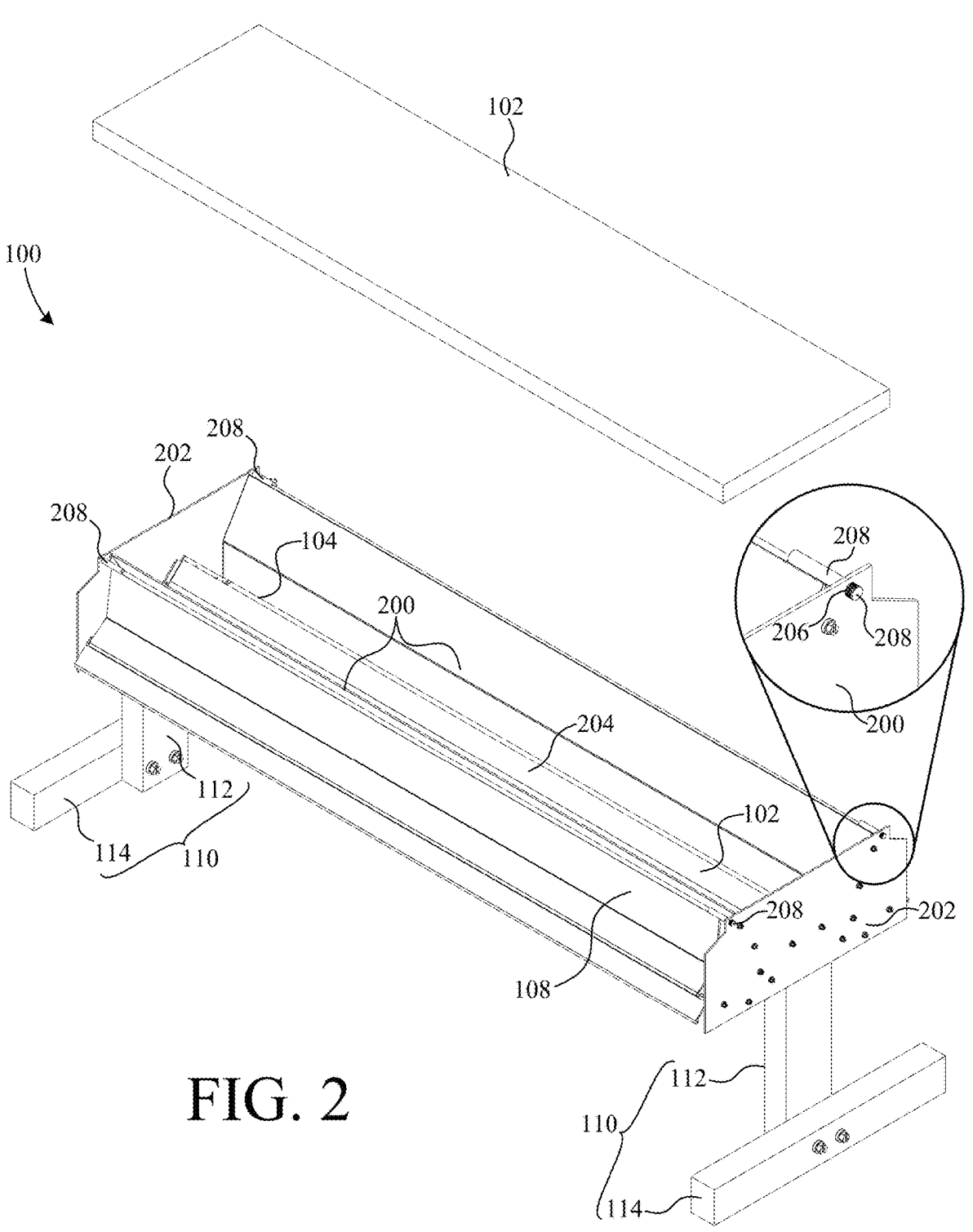
FIG. 2 is a perspective view of the feeder of FIG. 1 with the lid removed.

FIG. 2 shows a perspective view of feeder 100 with lid 102 removed to show interior details of hopper 104. Feeder 100 is formed from multiple discrete sheets of materials that are cut, bent (e.g. sheet metal brake) into shape, and fastened together. In this example, there are eight sheets, which are formed from a respective section of stainless steel sheet metal. Specifically, a first sheet of stainless steel is formed into lid 102, a second sheet of stainless steel is formed into a first sidewall 200 of hopper 104, a third sheet of stainless steel is formed into a second sidewall 200 of hopper 104, a fourth sheet of stainless steel is formed into a third sidewall 202 of hopper 104, a fifth sheet of stainless steel is formed into a fourth sidewall 202 of hopper 104, a sixth sheet of stainless steel is formed into a bottom wall 204 of hopper 104 and both feed pans 106, a seventh sheet of stainless steel is formed into a first one of doors 108, and an eighth sheet of stainless steel is formed into a second one of doors 108 (only one visible).

Each of the two sidewalls 202 defines a set of two apertures 206 through which rods 208 of doors 108 are disposed. Together, apertures 206 and rods 208 function as hinges. Each of doors 108 includes one of rods 208 fixed (i.e. welded) to each respective top end. Accordingly, rods 208 rotate in respective apertures 206 when door(s) 108 is/are urged inward.

Figure 3A:
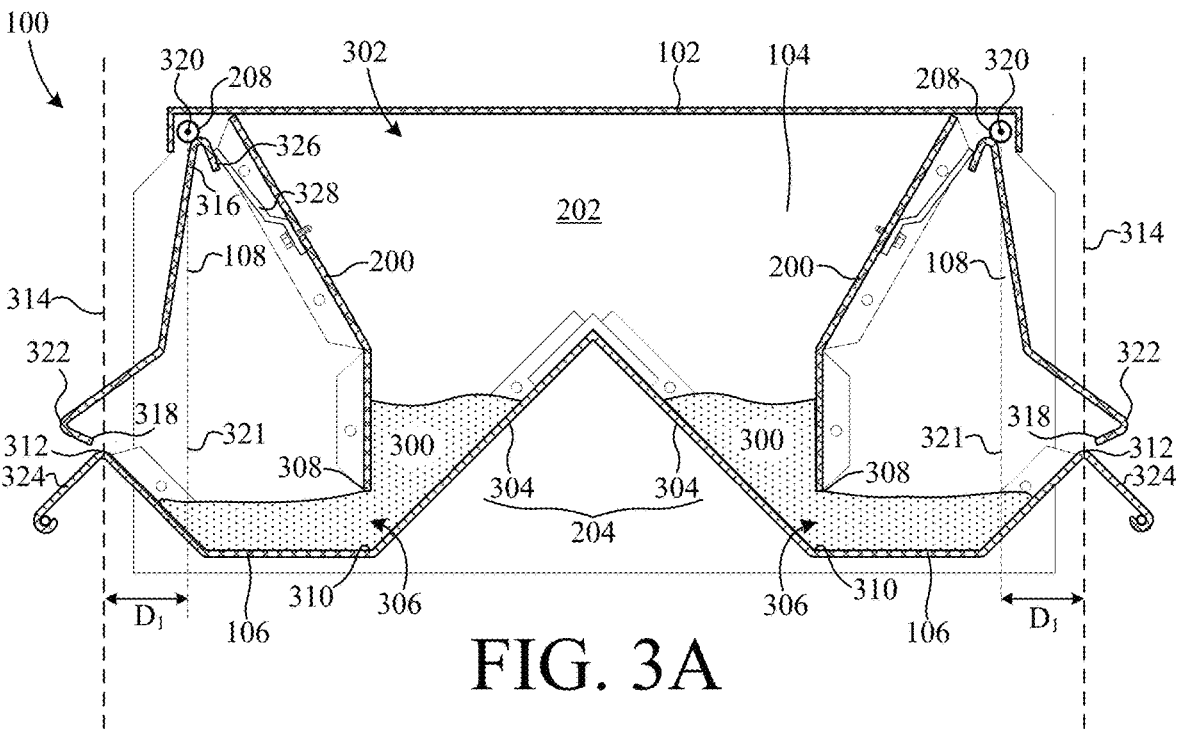
FIG. 3A is a cross-sectional side view, taken along line A-A of FIG. 1, of the feeder of FIG. 1 in a closed position.

FIG. 3A is a cross-sectional side view of feeder 100 taken along line A-A of FIG. 1 with doors 108 in a closed position. With doors 108 in the closed position, pests and precipitation cannot access feed 300 disposed in feeder 100.

Feeder 100 is refilled by first removing lid 102, then pouring feed 300 through an inlet 302 of hopper 104, and then putting lid 102 back on to cover inlet 302. Feed 300 is guided downward between the two inwardly sloped sidewalls 200, toward bottom wall 204. Bottom wall 204 includes a set of two opposing slopped surfaces 304 that direct feed 300 towards two respective outlets 306 of hopper 104. The feed 300 from outlets 306 flows to feed pans 106 and continuously refills feed pans 106 automatically as the feed is consumed by livestock. Each of outlets 306 is defined by the passage between a bottom respective edge 308 of sidewall 200 and a respective first edge 310 of a respective feed pan 106. Each of feed pans 106 includes a second edge 312, opposite respective first edge 310. Second edges 312 are disposed in respective planes 314 that are perpendicular to the page and, therefore, indicated by heavy phantom lines 314. Each of doors 108 includes a proximal end 316 and an opposite distal end 318. Each proximal end 316 is coupled (e.g., welded, wrapped, and so on) to a respective one of two rods 208, such that doors 108 are rotatable about respective axes 320 passing through rods 208. Axes 320 also extend perpendicular to the page and are, therefore, indicated by heavy dots coaxially aligned with rods 208.

The geometry and relative positions of various elements of feeder 100 are import aspects of the invention because they allow antlered and horned animals to feed without their antlers and horns blocking access to feed 300. For example, each axis 320 is disposed over a respective feed pan 106 as indicated by the vertical light phantom lines 321 passing through axes 320. As shown, feed 300 extends away from outlets 306, beyond lines 321. To protect feed 300 that extends horizontally beyond axes 320, doors 108 are angled outward from axes 320 such that distal ends 318 are horizontally offset from axes 320 by a distance D1. In this example, each distal end 318 extends over a respective second edge 312 of a respective feed pan 106 when doors 108 are closed.

There are several aspects of feeder 100 that prevent precipitation from running into feed 300 within hopper 302. The side edges of lid 102 extend over rods 208 such that precipitation falling onto lid 102 is directed onto doors 108. The distal portion 318 of each door 108 includes a bend 322 that extends over, and beyond, second edge 312 such that precipitation running off door 108 is directed onto a downward sloped surface 324 that extends downward and away from second edge 312. Moreover, the terminal edge of the distal portion 318 of each door 108 is disposed outward of second edge 312, so even water that might run around bend 322 and drip off of the terminal edge will fall onto sloped surface 324. Surfaces 324, feed pans 106, and bottom wall 204 are all integral parts of the same single sheet of material.

Figure 3B:
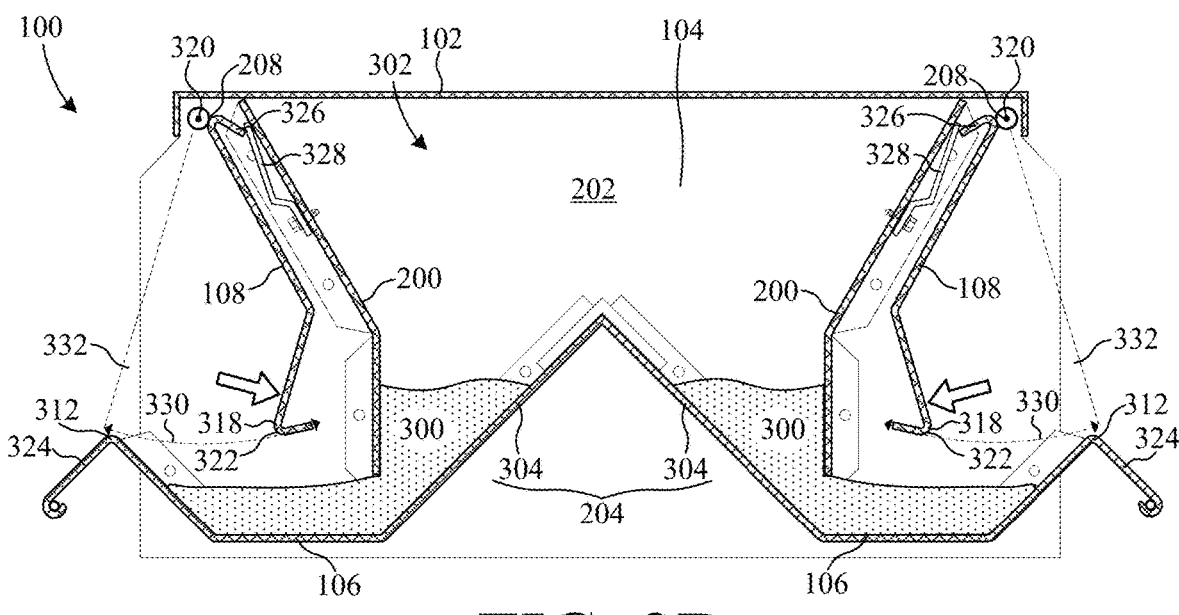
FIG. 3B is a cross-sectional side view, taken along line A-A of FIG. 1, of the feeder of FIG. 1 in an open position.

FIG. 3B is a cross-sectional side view of feeder 100 taken along line A-A of FIG. 1 with doors 108 urged inward (indicated by the block arrows) to an open position. When an animal urges one of doors 108 inward with its muzzle, the animal can access feed 300 disposed in feed pan 106.

When the animal is finished feeding and withdraws its muzzle out of feed pan 106, door 108 returns to a closed position automatically. Each of proximal portions 316 includes a lip 326 that engages a respective spring plate 328 that is screwed to the outsides of respective sidewall 200. Spring plate 328 urges against lip 326 to return door 108 to a closed position when door 108 is not being pushed inward by a feeding animal. In the closed position, spring plate 328 is in a relaxed or semi-relaxed state, exerting little or no force on lip 326. When door 108 is urged inward, distal portion 318 moves along a radial path, indicated by phantom arcs 330, that is initially downward from edge 312, about axis 320. As a result, the openings, indicated by phantom lines 332 drawn between axes 320 and the peaks of edges 312, into feed pans 106 are angled inward so as not to interfere with the feeding animal's antlers/horns. As door 108 is urged inward, spring plate 328 deflects and urges back onto lip 326 such that when door 108 is not being urged inward during feeding, it is urged back to a closed position, thereby preventing precipitation and pests from accessing feed 300.

Spring plate 328 is shown by way of example, but it should be understood that any other type of biasing member configured to exert the proper force on door 108 could be used instead. For example, a coil spring could be provided around one or more of rods 208.

Alternate methods for properly positioning door 108 in a closed position include, but are not limited to mechanical stops, counter weights, geometry of the door itself, and so on. An example of a mechanical stop would be for door 108 to engage edge 312 of feed pan 106. Another example of a mechanical stop would be stop pin(s) or protrusions extending from sidewalls 202 to engage doors 108 when they are in a closed position. An example of a counter weight would be to attach a weight to door 108 so that the center of gravity of the combination door 108 and the added weight are located inward from, or horizontally aligned with, axis 320, resulting in an outward rotation of door 108. In other words, the animal would be lifting the vertical position of the weight as door 108 is urged open. An example of using the geometry of the door itself would be to provide bends in door 108 that result in a center of mass located horizontally inward of axis 320. Using a combination of any of biasing members, mechanical stops, counter weights, and/or door geometry would facilitate balancing the force required to keep door 108 closed and a force low enough to allow livestock access.

Figure 4:
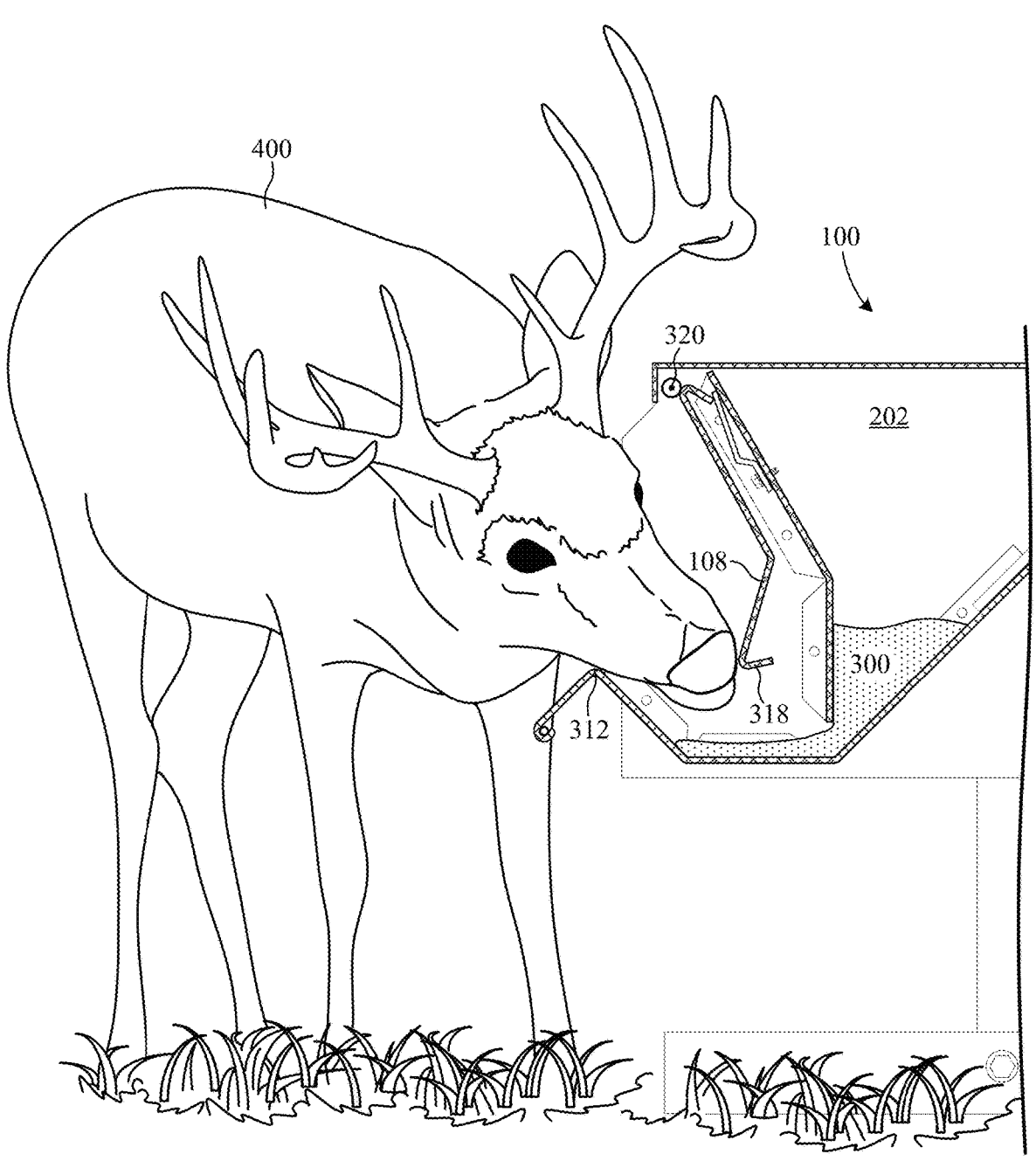
FIG. 4 is a cross-sectional side view of the feeder of FIG. 1 being accessed by a deer.

FIG. 4 shows a cross-sectional side view of feeder 100 taken along line A-A of FIG. 1, while being used by a deer 400. As shown, deer 400 is able to feed from feeder 100 without its antlers obstructing access to feed 300. This is due in part to the shape of door 108 and the location of the peak of edge 312. Specifically, door 108 is angled outward such that axis 320 is not directly above distal portion 318 and the peak of edge 312 when door 108 is closed. Rather, distal portion 312 is disposed horizontally away from vertical phantom line 321 (shown in FIG. 3A) passing through rod 208, thereby creating an angled opening indicated by phantom line 332 of FIG. 3B.

The reduced height of feeder 100 also facilitates easier access by antlered/horned animals. As shown in FIG. 4, the left antler of the deer can be positioned above feeder 100, thereby allowing easy access into the angled opening 332 into feeder 100. The inventor has found that an opening 332 having an overall height of 8 inches is suitable for white tail deer. Depending on the particular livestock, overall heights of 10 inches, 12 inches, or greater can be used. In any case, the overall height should not exceed the point where the top of the feeder will interfere with the horns/antlers of the livestock, which depends on the particular anatomy of the livestock. Feeders with an overall height (vertical dimension from the bottom of feed pan 106 to the top surface of lid 102 of 8-12 inches are suitable for a range of horned/antlered animals.

FIGS. 5-8 show alternate livestock feeders, which are substantially similar to feeder 100 but modified to hold even more feed. The capacity of each feeder is increased, at least partially, by increasing certain dimensions and contours of the feeder, while still maintaining proper clearance above the feeding troughs for antlered and/or horned animals.

Figure 5:
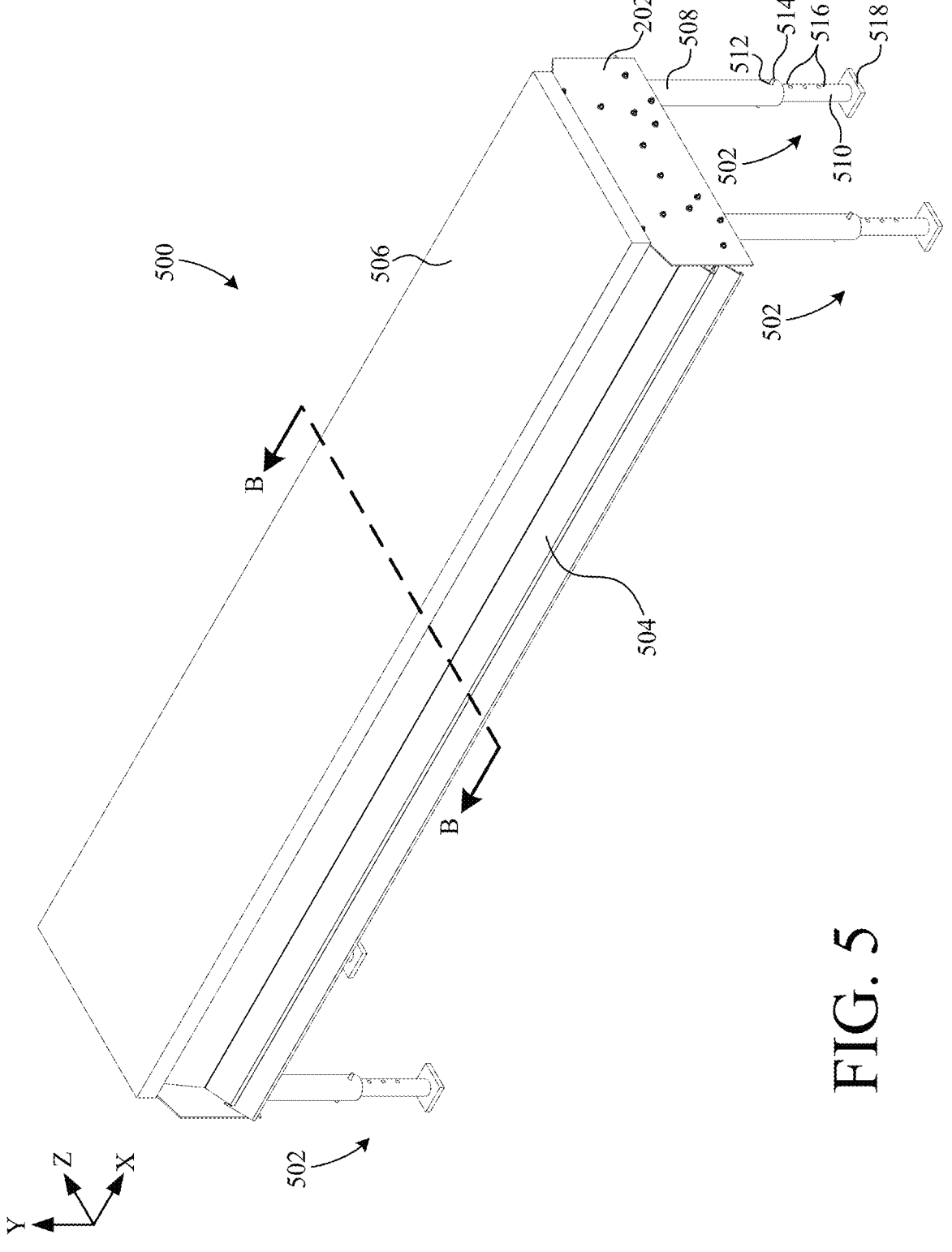
FIG. 5 is a perspective view of an alternate livestock feeder.

FIG. 5 shows a perspective view of another example livestock feeder 500 for antlered and/or horned animals. Feeder 500 is similar to feeder 100, except that feeder 500 is made longer in the x-direction and includes alternate legs 502. Therefore, like elements are denoted with like reference numbers. The added length in the x-direction allows feeder 500 to hold more feed than feeder 100 and also feed more animals at a time. Because the main difference between feeders 500 and 100 is the length in the x-direction, the cross-section taken along line B-B would be appear the same as the cross-section of feeder 100 taken along line A-A (FIG. 1), with the exception of legs 502 being different than legs 110. Feeder 500 includes a set of two doors 504 that are substantially similar to doors 108, but doors 504 are longer in the x-direction. Likewise, feeder 500 includes a lid 506 that is substantially similar to lid 102, but made longer in the x-direction.

The length of each leg 502 is adjustable so that the height of feeder 500 in the y-direction is adjustable and also to accommodate unlevel ground. Each of legs 502 includes a top portion 508 and a bottom portion 510. The top of top portion 508 is fixed to the bottom of feeder 500 and bottom portion 510 is adjustably coupled to top portion 508 in a telescoping relationship. That is, bottom portion 510 is adjustably inserted into the bottom of top portion 508. Top portion 508 defines an aperture 512 that is configured to receive a removable securement pin 514. Bottom portion 510 defines a column of apertures 516, each being disposed to be selectively coaxially aligned with aperture 512 and receive pin 514 to facilitate height adjustability. Bottom portion 510 also includes a foot 518 to disperse the weight of feeder 500 and add stability to feeder 500.

Figure 6:
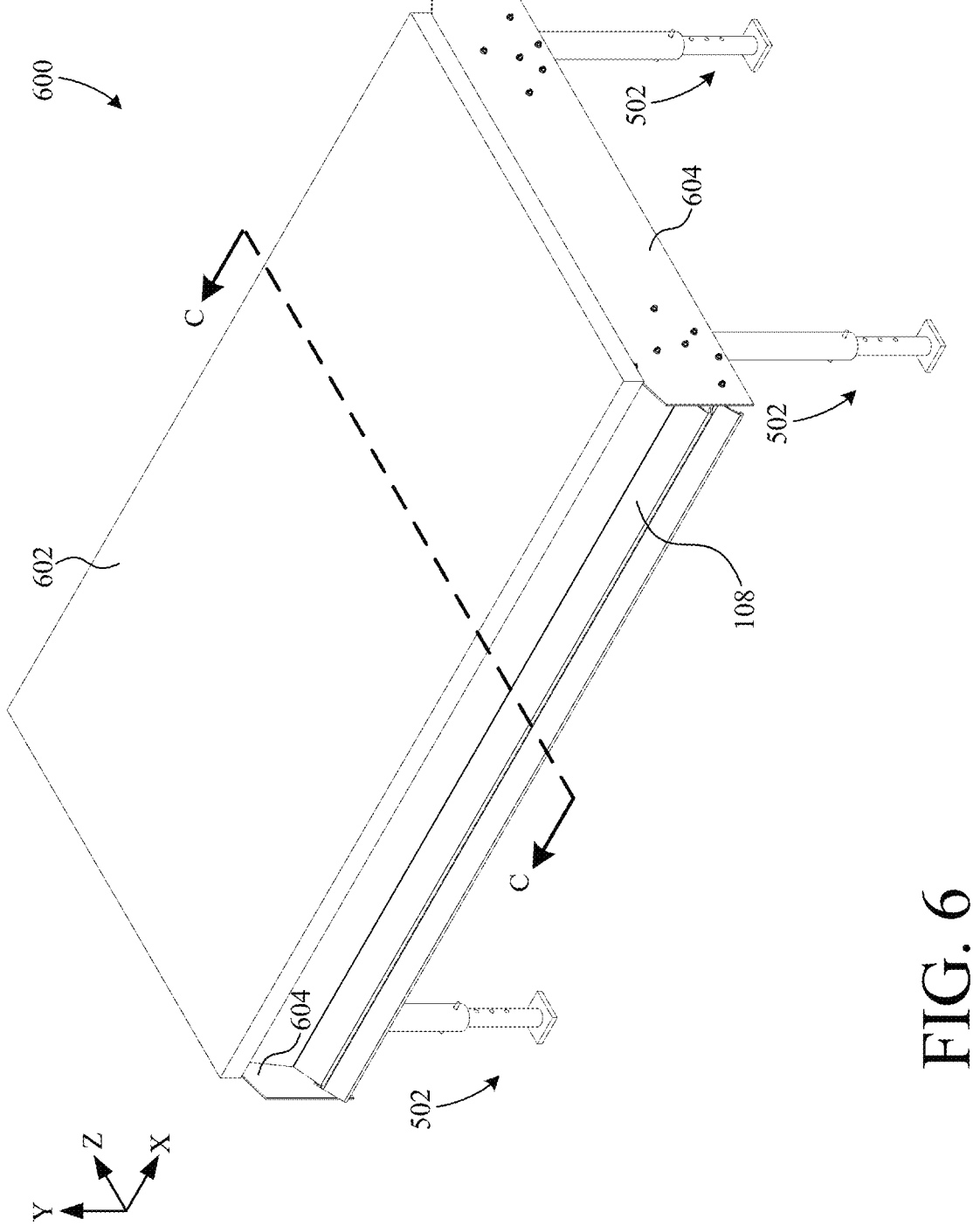
FIG. 6 is a perspective view of another alternate livestock feeder.

FIG. 6 shows a perspective view of yet another livestock feeder 600 for antlered and/or horned animals. Feeder 600 is similar to feeder 100, except that feeder 600 is made wider in the z-direction and includes alternate legs 502. Therefore, like elements are denoted with like reference numbers. The added width in the z-direction allows feeder 600 to hold more feed than feeder 100. Because the main difference between feeders 600 and 100 is the width in the z-direction, the cross-section taken along line C-C would be appear the same as the cross-section of feeder 100 taken along line A-A (FIG. 1) with the exception of legs 502 being different than legs 110 and central portion 204 (shown in FIG. 3A) being wider. Feeder 600 includes a lid 602 that is substantially similar to lid 102 but made wider in the z-direction. Likewise, feeder 600 includes two sidewalls 604 that are substantially similar to sidewalls 202 but are wider in the z-direction.

Figure 7:
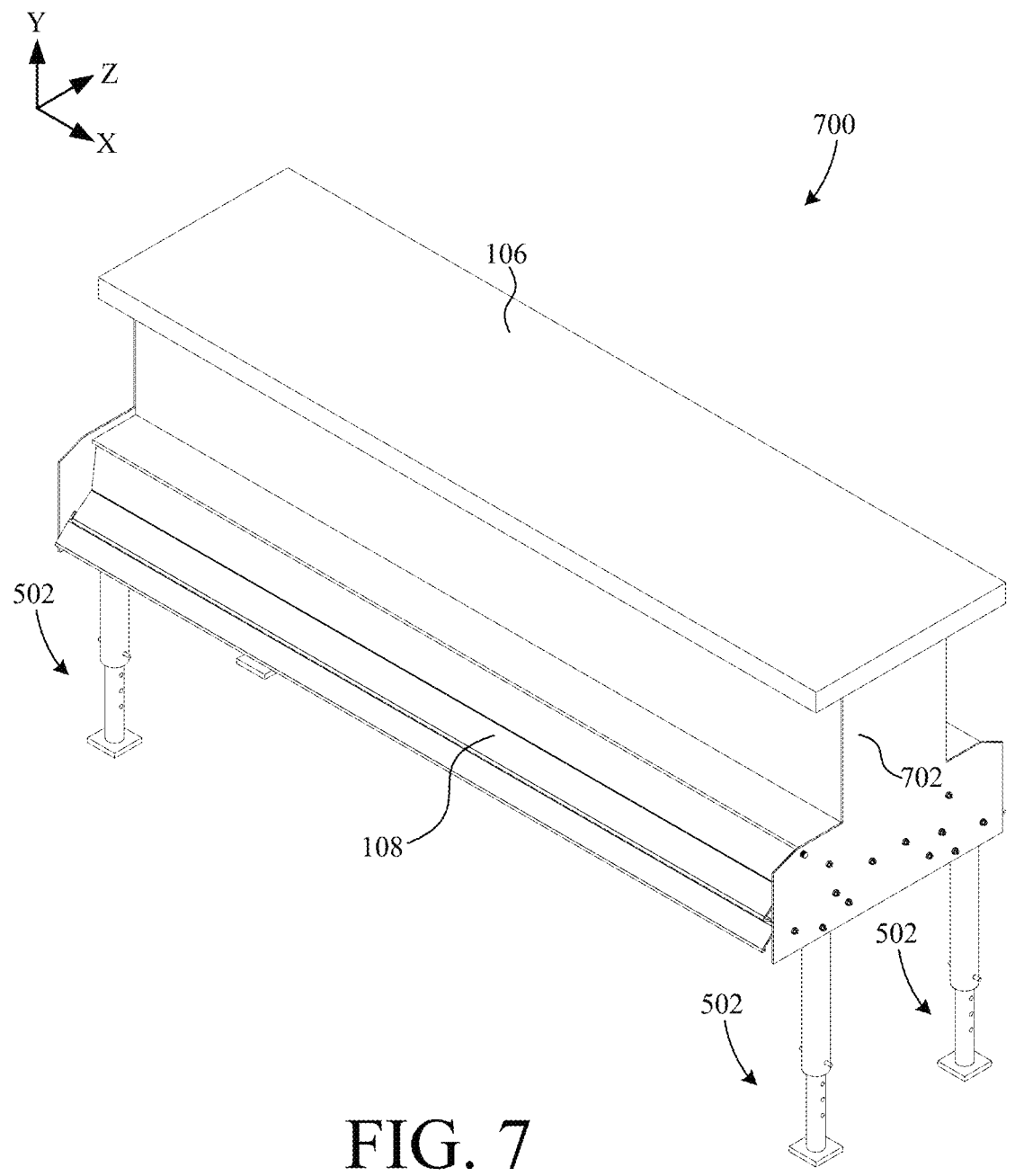
FIG. 7 is a perspective view of yet another alternate livestock feeder.

FIG. 7 shows a perspective view of yet another example livestock feeder 700 for antlered and/or horned animals (e.g., deer, goats, etc.). Feeder 700 is similar to feeder 100, except that the central portion of feeder 600 is made taller in the y-direction, and feeder 700 includes alternate legs 502. Therefore, like elements are denoted with like reference numbers. The added height in the y-direction allows feeder 700 to hold more feed than feeder 100. Feeder 700 includes two sidewalls 702 that are substantially similar to sidewalls 202, but are taller in the y-direction and shaped as shown in FIG. 7. Because only the central portion of feeder 600 is taller, the walls of the bin are set back (inwardly) from doors 108, so that the bin does not interfere with the horns/antlers of feeding livestock.

Figure 8:
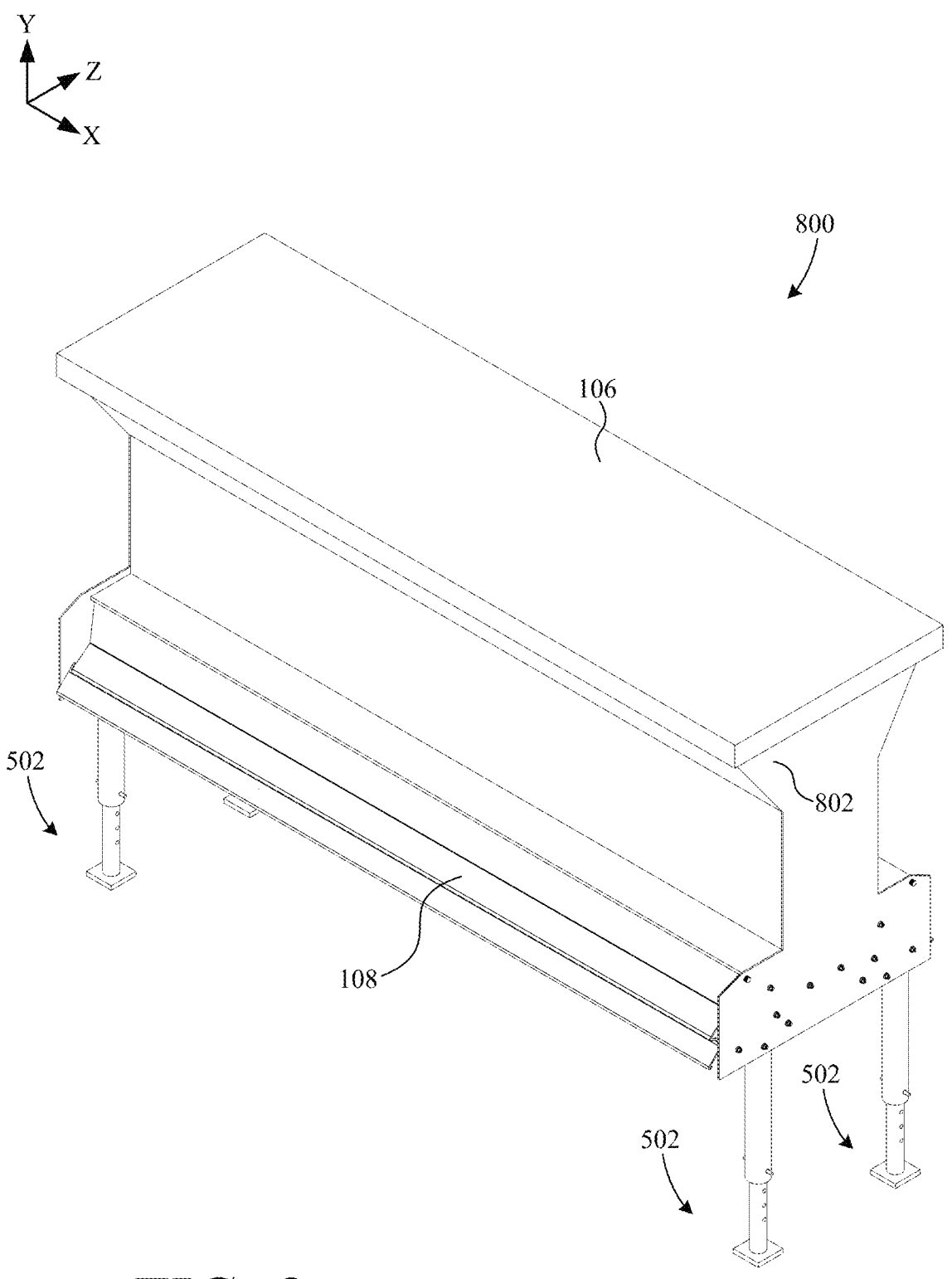
FIG. 8 is a perspective view of yet another alternate livestock feeder.

FIG. 8 shows a perspective view of yet another livestock feeder 800 for antlered and/or horned animals (e.g., deer, goats, etc.). Feeder 800 is similar to feeder 700, except that the upper part of the central portion of feeder 800 is beveled outward to hold even more feed than feeder 700. Therefore, like elements are denoted with like reference numbers. Feeder 800 includes two sidewalls 802 that are substantially similar to sidewalls 702 but are wider at the top and angled to channel feed downward. The outward bevels are disposed at a height sufficient to avoid interference with the antlers/horns of feeding livestock.

Example feeders 500, 600, 700, and 800 all include particular features that increase the capacity of the respective feeder. It should be understood, however, that any combination of these features can be embodied in a single feeder, to even further increase the feed capacity of the feeder. For example, the extra width of feeder 600 (in the z-direction) and the extra height of feeder 700 (in the y-direction) could be combined in a single feeder. Indeed, any feature of any of the example feeders disclosed herein (e.g., in FIGS. 1-10 or the written description thereof) can be combined with any one or more features of any one or more of the other example feeders.

Figure 9:
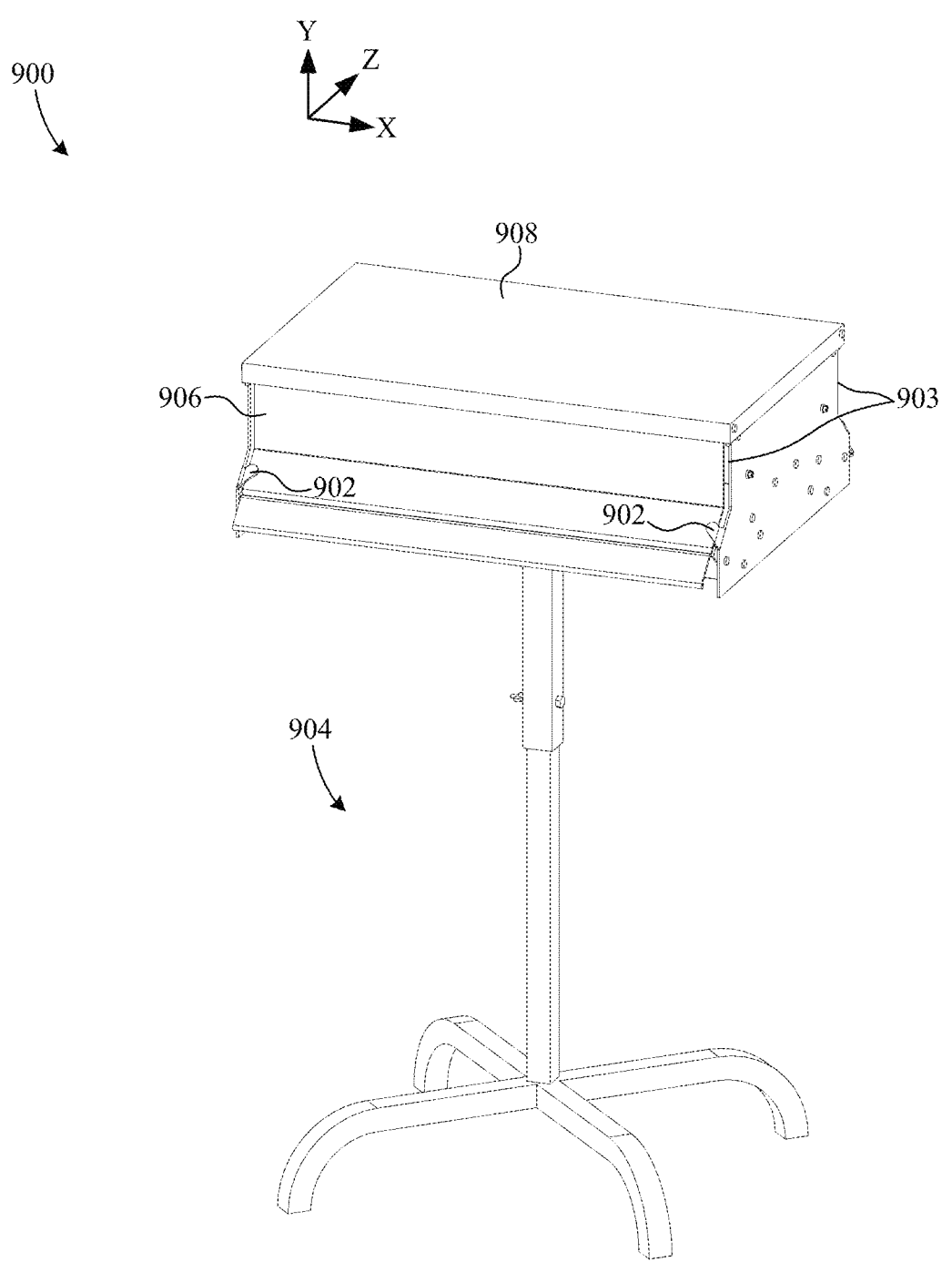
FIG. 9 is a perspective view of yet another alternate livestock feeder.

FIG. 9 shows a perspective view of another example livestock feeder 900 for antlered and/or horned animals. Feeder 900 is similar to feeder 100, except that feeder 900 is made shorter in the x-direction, includes two sets of door stoppers 902 (only two of four visible), and includes a pedestal 904 rather than a plurality of individual legs. Therefore, like elements are denoted with like reference numbers. The shortened length in the x-direction allows feeder 900 to be smaller and easier to move from one location to the next. Because the main difference between feeders 900 and 100 is the length in the x-direction, the cross-section taken along line D-D would be appear the same as the cross-section of feeder 100 taken along line A-A (FIG. 1), with the exception of pedestal 904 being different than legs 110. Feeder 900 includes a set of two doors 906 that are substantially similar to doors 108, but doors 906 are shorter in the x-direction. Likewise, feeder 900 includes a lid 908 that is substantially similar to lid 102, but made shorter in the x-direction. Feeder 900 includes two opposing sidewalls 910 that are substantially similar to sidewalls 202 but further define door stoppers 902 and cutaways 903. Stoppers 902 are protrusions that are bent ninety degrees to limit doors 906 from being urged outward beyond a properly closed position when doors 906 transition from an open position back to a closed position. Cutaways 903 are contoured to the side profile shape of doors 906 to further prevent obstruction to feeding animals.

Figure 10:
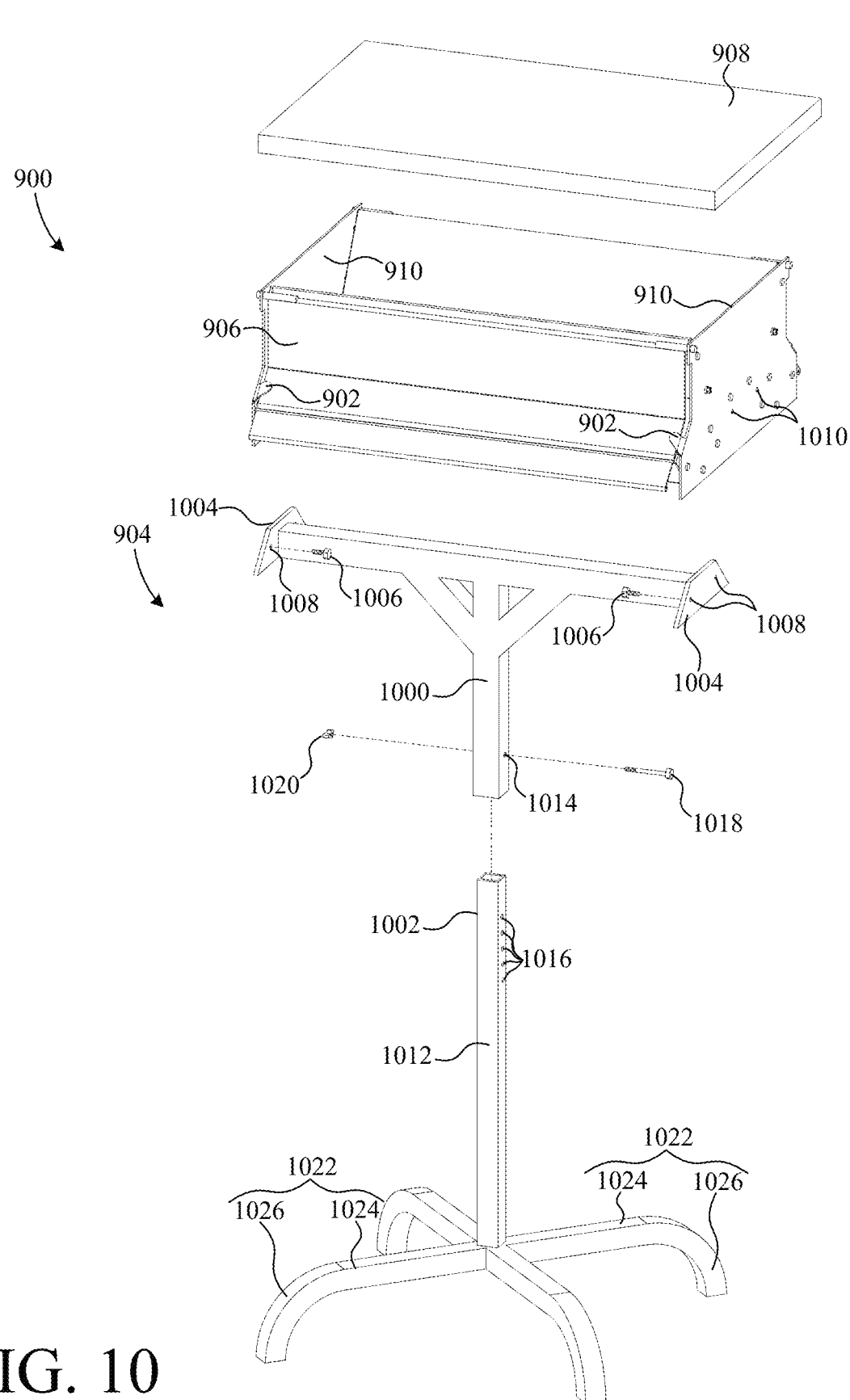
FIG. 10 is an exploded perspective view of the livestock feeder of FIG. 9.

FIG. 10 shows a partially exploded perspective view of feeder 900. The height of pedestal 904 is adjustable so that the height of feeder 900 in the y-direction is adjustable. Pedestal 904 includes a top portion 1000 adjustably coupled to a bottom portion 1002. Top portion 1000 is a T-shaped rigid structure that is formed from stainless steel square stock. Top portion 1000 includes a set of side brackets 1004 that mount to the interior surfaces of respective sidewalls 910 via a set of four bolts 1006 or any other suitable fasteners. Bolts 1006 pass through respective apertures 1008 formed in brackets 1004 and respective apertures 1010 of respective sidewalls 910. Top portion 1000 further includes an opening (not visible) that receives a column 1012 of bottom portion 1002. Top portion includes a set of apertures 1014 that coaxially align with any of apertures 1016 formed in column 1012 to facilitate vertical adjustment of feeder 900. When apertures 1014 of top portion 1000 are aligned with a chosen set of apertures 1016 of column 1012, a bolt 1018 (or any other type of suitable retainer) is disposed through the apertures to fix top portion 1000 with respect to column 1012. Then, a nut 1020 is threaded onto bolt 1018.

Bottom portion 1002 is also formed from stainless steel square stock and further includes a set of four legs 1022 extending from the bottom of column 1012. Each of legs 1022 includes a horizontal portion 1024 with one end fixed (e.g., welded) to column 1012 and an opposite second end 1026 that is bent ninety degrees to form a foot.

The description of particular embodiments of the present invention is now complete. Many of the described features may be substituted, altered or omitted without departing from the scope of the invention. For example, alternate door return devices (e.g., weights, magnets, etc.), may be substituted for the spring plates. As another example, alternate materials (e.g., plastic, wood, etc.) may be used to construct the feeder components. As another example, although the example embodiment is a symmetrical, double-sided feeder, a single-sided feeder would provide many of the advantages described herein. As yet another example, the legs of the example embodiment can be omitted, and the feeder can be mounted directly on a fence rail or supported on another structure. These and other deviations from the particular embodiments shown will be apparent to those skilled in the art, particularly in view of the foregoing disclosure.

I claim:

1. A livestock feeder comprising:

a hopper having a first inlet configured to receive feed and a first outlet configured to dispense said feed;

a first feed pan coupled to said hopper, said first feed pan having a first edge and a second edge, said first edge disposed to receive said feed dispensed from said first outlet, said second edge opposite said first edge;

a first door suspended over said first feed pan, said first door having a proximal portion and an opposite distal portion, said proximal portion of said first door pivotably coupled to said hopper to facilitate the rotation of said first door about a first axis disposed over said first feed pan to facilitate the transition of said first door between an open position wherein said first feed pan is accessible to livestock and a closed position wherein said distal end of said first door extends over said second edge of said first feed pan, said first axis being parallel to and spaced apart from a first vertical plane passing through said second edge of said first feed pan a second feed pan coupled to said hopper, said second feed pan having a first edge and a second edge, said first edge of said second feed pan disposed to receive said feed dispensed from a second outlet of said hopper, said second edge of said second feed pan being opposite said first edge of said second feed pan; and a second door suspended over said second feed pan, said second door having a proximal portion and an opposite distal portion, said proximal portion of said second door pivotably coupled to said hopper to facilitate the rotation of said second door about a second axis disposed over said second feed pan to facilitate the transition of said second door between an open position wherein said second feed pan is accessible to livestock and a closed position wherein said distal end of said second door extends over said second edge of said second feed pan, said second axis being parallel to and spaced apart from a second vertical plane passing through said second edge of said second feed pan; and wherein said second vertical plane is parallel to said first vertical plane;

said distal portion of said second door moves toward said first vertical plane as said second door transitions to said open position; and said distal portion of said first door moves toward said second vertical plane as said first door transitions to said open position.

2. The livestock feeder of claim 1, further comprising a biasing member engaging said first door to urge said first door from said open position to said closed position.

3. The livestock feeder of claim 2, further comprising a stopper disposed to engage an exterior surface of said first door when said first door is in said closed position to prevent further rotation of said first door about said first axis.

4. The livestock feeder of claim 1, wherein:

said livestock feeder includes a first sheet of material, a second sheet of material, a third sheet of material, a fourth sheet of material, a fifth sheet of material, and a sixth sheet of material;

said first sheet of material defines a first sidewall of said hopper;

said second sheet of material defines a second sidewall of said hopper opposite said first sidewall of said hopper;

said second sheet of material is disposed parallel to said first sheet of material;

said third sheet of material defines a third sidewall of said hopper and extends perpendicular to said first sheet of material and said second sheet of material;

said fourth sheet of material defines a fourth sidewall of said hopper and extends perpendicular to said first sheet of material and said second sheet of material;

said fifth sheet of material defines said first feed pan and extends perpendicular to said first sheet of material and said second sheet of material; and said sixth sheet of material defines said first door and extends perpendicular to said first sheet of material and said second sheet of material.

5. The livestock feeder of claim 4, wherein:

said first sheet of material is a first discrete section of sheet metal;

said second sheet of material is a second discrete section of sheet metal;

said third sheet of material is a third discrete section of sheet metal;

said fourth sheet of material is a fourth discrete section of sheet metal;

said fifth sheet of material is a fifth discrete section of sheet metal; and said sixth sheet of material is a sixth discrete section of sheet metal.

6. The livestock feeder of claim 1, wherein an uppermost portion of said first outlet of said hopper is disposed at a vertical height sufficient to allow said feed dispensed from said first outlet to move outward a horizontal distance away from said first outlet that is greater than the horizontal distance between said first axis and said uppermost portion of said first outlet.

7. The livestock feeder of claim 1, wherein:

said distal portion of said first door includes a bend and a terminal edge;

said bend is directed toward said first outlet; and said terminal edge is disposed on an opposite side of said first vertical plane relative to said first axis when said first door is in said closed position.

8. The livestock feeder of claim 1, further comprising a sloped surface extending from said second edge of said first feed pan in a direction away from said first outlet to direct precipitation away from said feed disposed in said first feed pan, said first vertical plane being disposed between said sloped surface and said first outlet of said hopper.

9. The livestock feeder of claim 1, further comprising a pedestal, said pedestal including:

a base disposed below said first feed pan; and a column extending upward from said base and coupled to said hopper, said first feed pan, and said first door.

10. The livestock feeder of claim 1, wherein:

said first door includes a top section extending at least partially downward from said proximal portion;

said first door includes a bottom section disposed between said top section and said distal portion; and said bottom section extends from said top section at a downward angle toward said second edge of said first feed pan when said first door is in said closed position.

11. The livestock feeder of claim 1, further comprising:

a first biasing member engaging said first door and urging said first door toward said first vertical plane; and a second biasing member engaging said second door and urging said second door toward said second vertical plane.

12. The livestock feeder of claim 11, further comprising:

a first stopper disposed to abut an exterior surface of said first door when said first door is in said closed position to prevent further rotation of said first door about said first axis; and a second stopper disposed to abut an exterior surface of said second door when said second door is in said closed position to prevent further rotation of said second door about said second axis.

13. The livestock feeder of claim 1, further comprising a first sheet of material, a second sheet of material, a third sheet of material, a fourth sheet of material, a fifth sheet of material, a sixth sheet of material, and a seventh sheet of material, and wherein:

said first sheet of material defines a first sidewall of said hopper;

said second sheet of material defines a second sidewall of said hopper opposite said first sidewall of said hopper;

said second sheet of material is disposed parallel to said first sheet of material;

said third sheet of material defines a third sidewall of said hopper and extends perpendicular to said first sheet of material and said second sheet of material;

said fourth sheet of material defines a fourth sidewall of said hopper and extends perpendicular to said first sheet of material and said second sheet of material;

said fifth sheet of material defines said first feed pan and said second feed pan, said fifth sheet of material extending perpendicular to said first sheet of material and said second sheet of material;

said sixth sheet of material defines said first door and extends perpendicular to said first sheet of material and said second sheet of material; and said seventh sheet of material defines said second door and extends perpendicular to said first sheet of material and said second sheet of material.

14. The livestock feeder of claim 13, wherein:

said first sheet of material is a first discrete section of sheet metal;

said second sheet of material is a second discrete section of sheet metal;

said third sheet of material is a third discrete section of sheet metal;

said fourth sheet of material is a fourth discrete section of sheet metal;

said fifth sheet of material is a fifth discrete section of sheet metal;

said sixth sheet of material is a sixth discrete section of sheet metal; and said seventh sheet of material is a seventh discrete section of sheet metal.

15. The livestock feeder of claim 1, wherein:

said first door includes a top section extending at least partially downward from said proximal portion of said first door;

said first door includes a bottom section disposed between said top section of said first door and said distal portion of said first door;

said bottom section of said first door extends from said top section of said first door at a downward angle toward said second edge of said first feed pan when said first door is in said closed position;

said second door includes a top section extending at least partially downward from said proximal portion of said second door;

said second door includes a bottom section disposed between said top section of said second door and said distal portion of said second door; and said bottom section of said second door extends from said top section of said second door at a downward angle toward said second edge of said second feed pan when said second door is in said closed position.

16. The livestock feeder of claim 1, wherein said first feed pan and said second feed pan are integral parts of a single sheet of material, said single sheet of material defining a bottom wall of said hopper, said single sheet of material including an intermediate portion disposed between said first feed pan and said second feed pan, said intermediate portion defining a first sloped surface that routes said feed from said hopper to said first outlet of said hopper and a second sloped surface that routes said feed from said hopper to said second outlet of said hopper.

17. The livestock feeder of claim 1, further comprising a lid disposed over said inlet of said hopper and over said first axis.

* * * * *